Nov. 20, 1962 E. SCHASCHL ET AL 3,065,151
APPARATUS FOR CORROSION TESTING
Filed July 17, 1958 2 Sheets-Sheet 1

INVENTORS
EDWARD SCHASCHL
BY GLENN A. MARSH

*Edward W. Long*

ATTORNEY

Nov. 20, 1962 E. SCHASCHL ET AL 3,065,151
APPARATUS FOR CORROSION TESTING
Filed July 17, 1958 2 Sheets-Sheet 2

INVENTORS
EDWARD SCHASCHL
BY GLENN A. MARSH
Edward H. Long
ATTORNEY

United States Patent Office 3,065,151
Patented Nov. 20, 1962

3,065,151
APPARATUS FOR CORROSION TESTING
Edward Schaschl and Glenn A. Marsh, Crystal Lake, Ill., assignors to The Pure Oil Company, Chicago, Ill., a corporation of Ohio
Filed July 17, 1958, Ser. No. 749,085
15 Claims. (Cl. 204—1)

This invention relates to a method and apparatus for corrosion testing which are designed to quantitatively separate anodic and cathodic areas of a corrosion process. More particularly, the invention relates to an apparatus comprising a test cell wherein the separation of anodic and cathodic areas of corrosion can be accomplished, and thereby make possible experimental work and comparisons heretofore considered to be impossible or extremely difficult in these types of studies.

One of the most practical methods of determining the extent of corrosion in operating equipment is by direct observation of the influence of corrosion under actual service conditions. In this method the heterogeneity of the corrosive environment is taken into consideration. Various methods have been devised for this purpose, including the placement of a metallic specimen in the corrosive environment on a simple type of hanger, and the more complicated procedure of employing a specimen holder to support a number of test specimens in insulated relationship and to exclude galvanic contacts. These methods require tedious weighing and re-weighing of the test specimens and have the additional disadvantage of not being applicable to performing corrosion tests wherein a comparison can be made of anodic and cathodic areas of corrosion.

The device of this invention utilizes as one element thereof, or as a pair of cooperating elements, means for exposing corrodible test elements or specimens to a corrosive atmosphere which are quite similar to those described in a series of United States patents. Accordingly, the various test-element arrangements disclosed and described in U.S. Patents 2,824,283, 2,830,265, 2,834,-858, 2,851,570, and 2,864,252 may be used as a portion of the present apparatus:

Certain modifications of the test probes themselves, or the arrangement of test elements in these patents, will be described in relation to the improvements of the present invention. The test probes are intended to be utilized in conjunction with a resistance-change corrosion-indicating circuit as shown, for example, in the aforementioned Patent No. 2,830,265.

It becomes, therefore, a primary object of this invention to provide an apparatus for corrosion testing whereby a direct comparison of anodic and cathodic areas of a corrosion system can be made.

A second object of this invention is to provide a new form of corrosion-testing apparatus embodying means for detecting separately and separately recording the anodic and cathodic areas of the corrosion system.

Still another object of the invention is to provide a method of testing the anodic and cathodic areas of a corroding system.

These and other objects of the invention will become apparent or be described herein more fully as the invention is developed.

In the study of corrosion and corrosion rates, it is frequently desirable to study the effect of various inhibitors or other environmental factors which affect the rate or extent of corrosion at both the anodic and cathodic areas of the system. To the present knowledge of the inventors, no means have been available for separately studying these areas. The present device has been developed as a test cell and apparatus whereby this separation of the cathodic and anodic areas can be accomplished. To further illustrate these concepts, reference is made in more detail to FIGURE 1.

Figure 2:
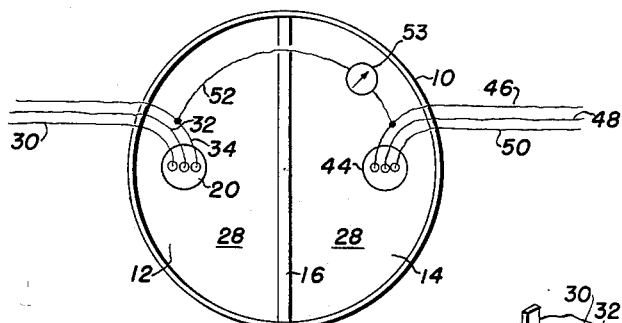
FIGURE 2 is a top plane-view of the apparatus shown in FIGURE 1 with the cover member removed.

The reference numeral 10 relates to a vessel designed to hold the corroding environments under study. Vessel 10 is divided into two compartments, 12 and 14, by means of porous plate 16 which extends across the diameter of vessel 10, as shown more clearly in FIGURE 2. Plate 16 prevents rapid diffusion of the corrosive environments within compartments 12 and 14 from one compartment to the other. Alternatively, compartments 12 and 14 may be separate vessels with the porous plate 16 comprising a salt bridge, the ends of which are plugged with a conducting diffusion barrier such as agar gel.

Corrosion-test probe 18 is shown attached to support-means 20 within compartment 12. Support 20 is designed to carry the test elements 22 and 24, having common lead 26, so that the same are immersed within the corrosive environment in compartment 12, and the support rests upon the liquid level as indicated at 28. Corrosion-test probe 18 is equipped with leads 30, 32 and 34.

A similar arrangement is provided in compartment 14, wherein corrosion-test probe 36, having test elements 38 and 40 with common lead 42, is attached to support 44 and provided with leads 46, 48 and 50. Lead 34 of test-probe 18 and lead 46 of test-probe 36 are connected together by wire 52 connected through meter 53. When compartments 12 and 14 are filled with the corrosive environment to be studied, corrosion-test probes 18 and 36 serve as an anode and cathode when connected by means of wire 52. Number 54 represents a cover member, with apertures, as at 56, for the electrical leads. Supports 20 and 44 may be in the form of floats or may be attached to cover member 54 to keep the corrosion probes in place.

By using a plurality of corrosion-test probes 18 in compartment 12, or corrosion-test probes 36 in compartment 14, the relative areas of the corroding surfaces within the corrosive atmospheres under study may be varied. The rates of corrosion of these corresponding areas are measured by the corrosion-measuring circuit connected to the respective leads from the plurality of corrosion-test probes It is thus seen that by establishing one corrosion-test probe as an anode and the other corrosion-test probe as a cathode, and also by changing the relative areas of the corroding anodic and corroding cathodic surfaces or by changing the environment within the two compartments concerned, the effect on the cathodic and/or anodic areas can be very carefully observed and certain correlations made. One result is that definite predictions as to the corrosive behavior of a given environment with a particular type of metal acting as the containing vessel therefor, as indicated by the composition of the corrosion-test probe, can be made. Also, the apparatus can be used in studying the mechanism of inhibition and/or acceleration of corrosion. Thus the invention can be used to determine the effect upon the rate of corrosion of different oxygen concentrations or oxygen ratios in the compartments. The effectiveness of various inhibitors and oxygen acceptors can be determined and very rapidly screened by applying the present apparatus and method.

Figure 1:
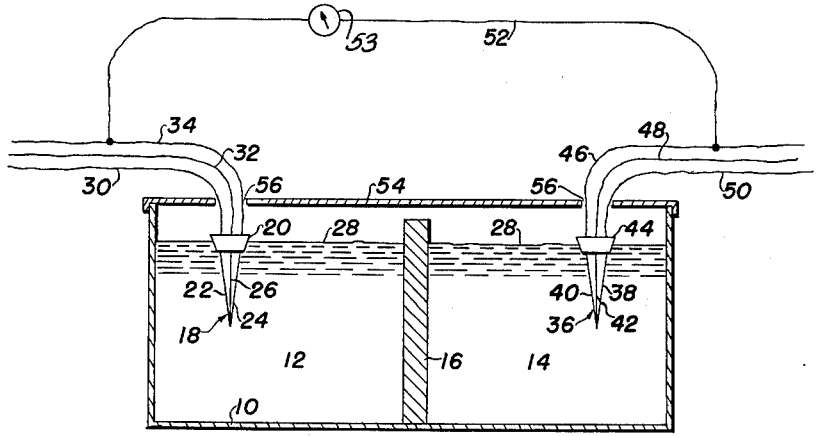
FIGURE 1 is a cross-sectional view showing the arrangement of test specimens in a simplified form of the apparatus in this invention and part of the electrical circuit therefor.
Figure 3:
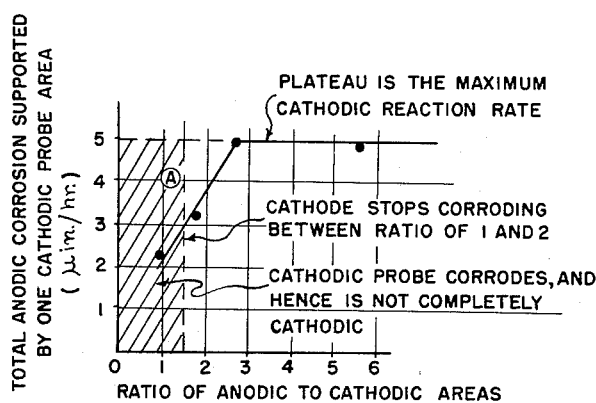
FIGURE 3 is a graph showing the ratios of anodic to cathodic areas of corrosion in relation to the total anodic corrosion supported by one cathodic probe area.

The invention is illustrated by the following example. The apparatus was connected through leads 30, 32, 34, 46, 48 and 50 to corrosion-measuring apparatus of the comparative resistance-type to determine the rates of corrosion at the anode and cathode at various ratios of anodic area to cathodic area. For this purpose, probes having varying ratios of anodic to cathodic areas were inserted into compartments 12 and 14 of the apparatus as shown in FIGURE 1. Following this, the corrosion rates of the cathodic and anodic areas were observed with one compartment aerated and the other deaerated. The results obtained are shown by the graph in FIGURE 3. The shaded area of the graph shows corrosion was occurring on both the anode and cathode. This indicated that the presumed cathodic probe was not entirely cathodic. As the area of the cathodic probe decreased to the ratio "A" shown on the graph, corrosion ceased on the predominantly cathodic probe and the probe, therefore, had been made entirely cathodic. This approximates the conditions that exist in naturally-occurring cells and is, therefore, the starting point for further experimental work. From this preliminary test work, it can be deduced that the ratio of anodic to cathodic areas should be slightly greater than the ratio represented by the point "A" on the graph when conducting inhibitor evaluations or other experiments on this particular system. Thus, corrosion of the cathodic area will not obscure the effects of the inhibitors or other variables. In the study of the corrosion in atmospheres containing brine or other aqueous solutions, where a concentration cell is established because of different oxygen concentrations in the fluid or liquid surrounding the anodic and cathodic areas, the rate of corrosion at different oxygen concentrations can be determined. Also, the effect of various inhibitors and oxygen acceptors can be screened by this method and apparatus very rapidly.

Figure 4:
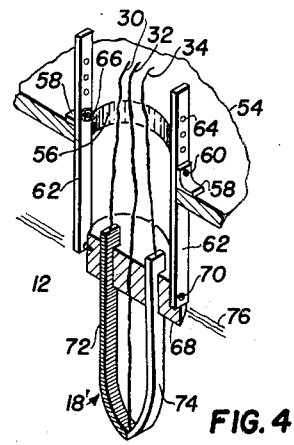
FIGURE 4 is a partial cross-sectional view showing a test probe in more detail and means for mounting same within compartment 12.

Referring to FIGURE 4, there is shown in partial cross-section a more detailed view of the manner in which test-probe 18' may be mounted or suspended from cover 54 through aperture 56 into corrosive atmosphere 12. L-shaped bracket 58 is soldered, welded or attached by means of a screw to cover 54. The upwardly extending ear is adjacent to the edge of hole 56 and carries bolt 60 passing through an aperture therethrough. Arm 62 carries a series of spaced holes 64 through its upper section, and bolt 60 extends through one such hole, being held to bracket 58 by means of nut 66. The lower end of arm 62 is attached to body-member 68 of test-probe 18' by means of screw 70 passing through an aperture in the end of arm 62. By means of these elements, probe 18' may be placed at any desired level in atmosphere 12. As an alternate construction, arms 62 may be considered as spring members with brackets 58 attached thereto. With aperture 56 larger than the outside diameter of the probe, the whole assembly can be installed in cover 54 by pinching arms 62 together, placing the probe through the hole 56, and releasing the arms so that the brackets catch on the lip or edge of hole 56.

The probe proper comprises base or body-member 68 carrying imbedded therein a coated or protected element 72 and an exposed element 74 which are made of the metallic materials of construction under test. Elements 72 and 74 come together with center lead 32 to form a common juncture. Various means may be used for affixing the test elements and lead in base 68. These elements may be sealed in the base 68 by molding the base around the elements. Leads 30 and 34 may be soldered to the elements 72 and 74, which are shown in the form of ribbons of metal. The level of the corrosive atmosphere is indicated at 76. If the environment is gaseous, means may be provided for sealing aperture 56.

Figure 5:
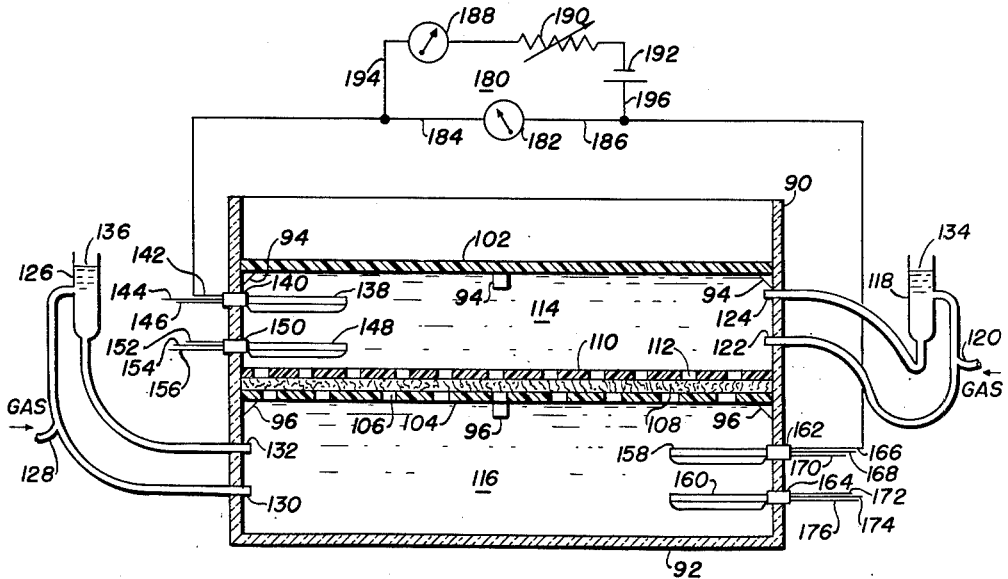
FIGURE 5 is a partial cross-sectional view showing another form of the apparatus.

In FIGURE 5, a partial cross-sectional and diagrammatic view of another form of the apparatus is shown. In FIGURE 5, a large glass container having wall 90 and bottom 92 is provided with brackets 94 to support cover member 102 and perforated plate 104. Cover member 102 encloses the top of the container and seals same from the air. Plate 104 has a plurality of spaced apertures 106. A layer of a semi-permeable substance such as agar is illustrated at 108, covered by plate 110 having a plurality of apertures 112. The purpose of the plates 104 and 110 is to provide a support for the agar layer 108, and the apertures 106 and 112 provide for the migration of ions and electrons therethrough. This arrangement divides the container into two separate zones, 114 and 116, which are filled with the liquid under study.

Zone 114 is provided with bubble-pump 118 having gas inlet 120, liquid inlet 122 and liquid outlet 124 communicating with zone 114. Similarly, zone 116 is equipped with bubble-pump 126 having gas inlet 128, liquid inlet 130 and liquid outlet 132. The tops of the bubble-pumps 118 and 126 are open, as at 134 and 136, to allow the escape of excess gas bubbled through the solution in these tubes, and also provide an opening into which various ingredients may be added to the zones 114 and 116.

Zone 114 is equipped with corrosion-test probe 138 mounted through wall 90 by means of plug or support 140, and is equipped with leads 142, 144, and 146. A second test-probe 148 is mounted in wall 90 by means of plug 150, and is equipped with leads 152, 154 and 156.

Similarly, the lower zone 116 is provided with corrosion-test probes 158 and 160 mounted by means of plugs 162 and 164, respectively, and provided with leads 166, 168 and 170, and 172, 174 and 176, respectively. Lead 142 of probe 138 and lead 166 of probe 158 are connected to current-measuring circuit 180 comprising galvanometer 182, connected therebetween by leads 184 and 186, and ammeter 188 connected in series with variable resistor 190 and battery or cell 192 (15 volt) through leads 194 and 196. Circuit 180, therefore, is in itself a zero-resistance ammeter comprised of the foregoing parts. Each of the corrosion-test probes is connected to a current-measuring instrument based on the change of resistance of the exposed test specimen of the probes as heretofore explained and as set out in more detail in the enumerated copending applications. The various leads may be provided with quick snap-on circuit attachments adapted to allow the use of a single corrosion-measuring instrument for all four probes. The various leads may be carried to a control panel with appropriate switches to make and break the necessary connections for this purpose.

Figure 6:
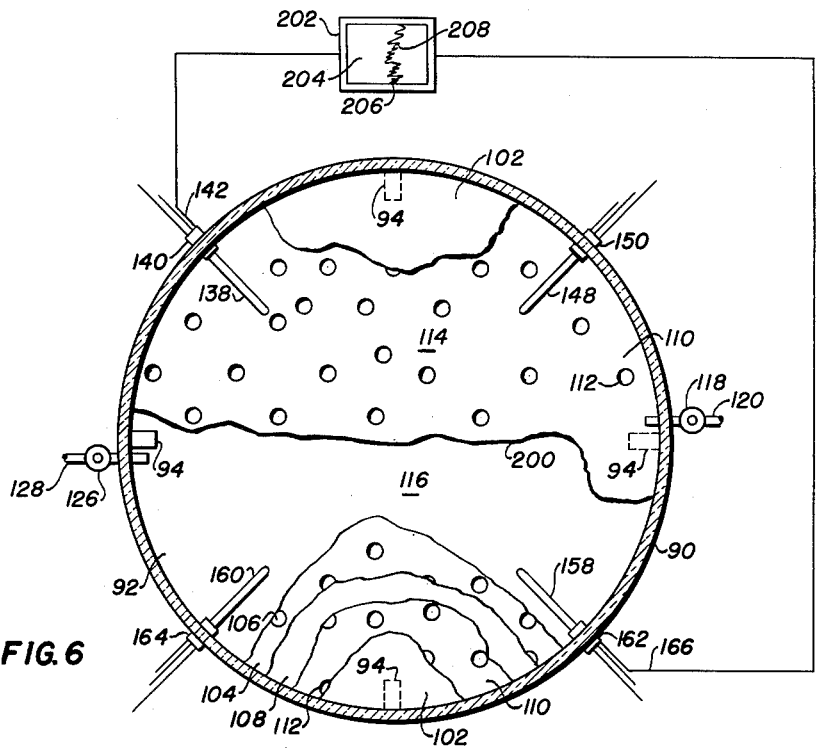
FIGURE 6 is a partial, cut-away, top view of the apparatus and arrangement of associated parts shown in FIGURE 5, with certain modifications and additions made thereto.

In FIGURE 6 there is shown a modification of the embodiments shown in FIGURE 5 to illustrate the various parts more clearly and also show a different arrangement of parts and the use of new parts. FIGURE 6 may be considered to be a view looking down on an arrangement similar to FIGURE 5 with the device partially cut vertically in half by line 200, with the same placement of bubble-pumps 118 and 126, but with a different placement of corrosion-test probes 138, 148, 158 and 160. Cover-member 102 is only partially shown to expose top plate 110 of zone 114 and also expose a portion of this same plate 110, membrane 108 and bottom plate 104 covering zone 116. In this embodiment, leads 142 and 166 are connected to a self-recording, zero-resistance ammeter 202, having moving paper strip 204, stylus 206 and indicia of the current flow are indicated by graphic line 208.

Returning to FIGURES 1 and 2, porous plate 16 may be any form of semi-permeable membrane such as an agar plug, or salt bridge in combination with an agar plug. Other semi-permeable membranes include animal tissue, various gels, including silica gel and alumina gel, and numerous resins. Salt bridges may be made of various strong electrolytes such as potassium chloride. Other semi-permeable membranes include sponge saturated with agar gel, fritted glass, porous stainless steel, metal screen, cloth, or paper dipped in collodion or agar gel.

Since the chemical reactions which occur in the corrosion of metals are complex, varied, and depend upon the composition, physical state and surface condition of the metallic material, some control and uniformity in procedure are necessary in carrying out the method. It is known that corrosion in the presence of moisture is an electrolytic reaction wherein the metal particles dissolve at certain areas or points on the metal surface. These become the anodes of corrosion cells. The adjacent areas on the metal surface at which hydrogen ions or dissolved oxygen are reduced become the cathodes. The physical or chemical non-conformity of the environment, or the metal itself, is said to initiate and promote the reactions. When dissolved $O_2$ is present (pH 5-9), only oxygen enters the cathodic reaction. Where there is no $O_2$, or the pH is below 5, then reduction of $H^+$ enters in the cathode reaction. The corrosion process is said to be cathodically controlled when the rate of corrosion is dependent on the rate of hydrogen or oxygen disposal. The process is said to be anodically controlled when the anodic reaction controls the rate of corrosion, i.e., the dissolution of the metal. Thus, it is known to control the process of corrosion by varying or controlling the extent of polarization at either the cathodic areas or the anodic areas, or both. By control of oxygen availability, the rate of cathodic depolarization is influenced by changes in metal ion concentration, since anodic corrosion is dependent on the dissolution of metal ions or the precipitation of anions at the metal surface. The present process allows the measurement of current-density and potential relationship of individual corrosion cell areas by using electrodes or test elements of known area.

Measurements have been made of electrodes exposed to a corrosive atmosphere wherein the potentials with reference to a saturated calomel scale were determined with an electronic interruption in conjunction with a potentiometric circuit to give an indication of significant changes in the slopes of the anodic and cathodic curves. These measurements allow the determination of the current value required to prevent corrosion, i.e., for cathodic protection. These methods do not, however, allow the separate and quantitative measurement of cathodic and anodic areas of a corrosive environment as with the present method and apparatus. The Hickling method, or the use of a "pulse polarizer," is not designed to make direct comparisons because the individual electrodes are placed in the same corrosive environment, one being cathodic and the other anodic. Another advantage of the present invention is that it allows the determination of the rates of corrosion at the anode and cathode at various ratios of anodic area to cathodic area. From this information the size of the sacrificial anode necessary to provide protection of a metal object, such as a pipe line, can be determined with accuracy. These aspects of the invention are illustrative.

The invention has as its main objective the provision of a method and apparatus to separate and study the action of anodic and cathodic zones in a corrosion cell. If the solutions in compartments 12 and 14 are identical, no current will flow in meter 53. However, if compartments 12 and 14 contain identical solutions except for the dissolved oxygen content, the exposed element 24 or 74 will become anodic if the oxygen content in compartment 12 is less than that of compartment 14. Variation of the ratios of the areas of exposed metal surface in 12 and 14 will then illustrate at what point the resulting cell current is controlled mainly by the anodic or cathodic reaction. The placing of an inhibitor in 12 or 14 will demonstrate whether the inhibitor is primarily absorbed on, or otherwise affects, the anodic or cathodic surfaces. Changes in the concentration of active ingredients in the environments in 12 and 14 will indicate what ingredients or combinations will affect the cell action. Thus, if both zones 12 and 14 contain an equal concentration of sodium chloride in water and one zone is treated to increase the oxygen concentration, that zone will become cathodic. It is accordingly, possible to study the effect of two or more such competing phenomena with this invention.

The separation of anodic and cathodic areas of corrosion, by altering the environment surrounding each of the test speciments or corrosion-test probes used in the apparatus of the several embodiments so far described, is accomplished in several ways, including variations in oxygen concentration, variations in dissolved solids concentration, different degrees of agitation, temperature differentials, pH differences, or combinations of these factors. The method chosen is the one most closely fitting the system under study. For example, in studying corrosion of iron in sea water, the salt concentration and pH may be held constant while the oxygen concentration is varied. In this case the mechanism of the reactions are:

$$\text{(anodic) } Fe \rightarrow Fe^{++} + 2e^-$$
$$\text{(cathodic) } O_2 + 2H_2O + 4e^- \rightarrow 4OH^-$$

In the connected specimens or probes, the one in the solution of low oxygen concentration would be anodic and the probe in the higher oxygen concentration would be cathodic. The effect of area of corroding surface at each reacting electrode, the effect of the oxygen concentration difference, and the effect of inhibitors on each individual reaction and on the combined reactions can then be studied. An unconnected specimen, such as probes 148 and 160, is provided in each zone to establish a blank rate for each environment.

The methods listed above will separate the anodic and cathodic reaction. The following are illustrative:

| Method | Anodic | Cathodic |
|---|---|---|
| $O_2$ cell | Low $O_2$ conc | High $O_2$ conc. |
| Dissolved solids | High conc | Low conc. |
| pH | Low pH | High pH. |

In using combinations of these methods, the importance of each factor will control the total effect observed or measured.

The invention is illustrated further by the following specific example:

It is known that steel in contact with an aqueous solution of non-uniform composition will usually corrode faster than steel in a homogeneous solution. This effect is known as concentration-cell corrosion. When the non-uniform component is dissolved oxygen, this particular kind of concentration cell is termed a differential aeration cell, and corrosion is accelerated in the zone having the least concentration of oxygen. When the non-uniform component is the dissolved solids, concentration of the resulting combination is called a salt-concentration cell. Using the apparatus of FIGURE 5, a diffusion barrier of ¼ inch layer of agar gel 108 was placed between plates 104 and 110. Air was introduced at a constant rate in lines 120 and 128 so as to keep both zones 114 and 116 air-saturated without introducing air bubbles and with moderately constant agitation. Zone 116 was filled with a sodium chloride solution having a conductivity of 0.05 ohm$^{-1}$-cm.$^{-1}$, equaling that of sea water. The upper zone 114 was filled with a salt solution having a concentration sufficient to give a conductivity of about 0.004 ohm$^{-1}$-cm.$^{-1}$. Aeration was continued until both zones were saturated, which occurs after about 2 hours. The corrison-test probes 138 and 158, constructed of thin steel ribbon, SAE 1010, or about 0.001 to 0.005 inch thickness, were connected to circuit 180, which included recorder 202.

Probes 148 and 160, constructed of the same steel ribbon, were connected to a portable corrosion-indicating circuit, and an indication was recorded of the normal corrosion rate of the isolated zones 114 and 116. The zero-resistance ammeter was read over a period of time and automatically recorded by recorder 202. This procedure permitted the simultaneous measurement of corrosion in both zones with and without cell action, and also the measurement of cell current. The cathodic and anodic cell areas were equal in making these measurements.

The corrosion rate at probe 148 was found to be 40 m.p.y. (mils per year) and the corrosion at probe 160 was found to be 13 m.p.y., which values are in the absence of cell action, that is, the probes 148 and 160 are not connected to each other by a wire. The completed circuit between probes 138 and 158 made the upper probe cathodic and its corrosion rate dropped from 40 m.p.y. to 0 m.p.y. The current flowing in the cell, as measured by the zero-resistance ammeter 182, was 80 ma./sq. ft. based on the area of the cathode. This is equivalent to a corrosion rate of 33 m.p.y. From the current flowing in the cell, one would have expected the corrosion rate of the anode to increase by 33 m.p.y. In fact, it was found that the rate increased by 56 m.p.y. in the anodic zone 116. The explanation may be due to the "chunk effect," that is, the tendency of high corrosion rates to proceed with the removal of "chunks" of metal containing several atoms. In the upper cathodic zone 114, the corrosion rate was decreased by cell action from 40 m.p.y. to 0 m.p.y. This decrease of 40 m.p.y. is in fair agreement with the current transferred.

The cathode/anode area ratio was next increased to 2.0. This caused an increase in anode corrosion rate to 160 m.p.y. At a cathode/anode ratio of 0.5, the anode corrosion rate was found to increase to 35 m.p.y. These experiments point out the significant fact that while the driving force of a concentration cell (i.e., difference in electrode potential) arises from different thermodynamic tendencies of steel to corrode in the different solutions, the corrosion that does occur requires the simultaneous functioning of anodic and cathodic reactions. The corrosion rate, roughly proportional to cathode area, indicates that the dissolved oxygen at the cathodic area is the controlling factor in this type of concentration cell; and without oxygen, no appreciable cell action occurs.

The apparatus and method of this invention may be applied to such studies as the effects of conductivity and velocity on the pitting of steel, comparisons of pitting rates (continuous vs. intermittent immersion), the effects of cathodic protection on pitting, the effects of dissolved oxygen on the corrosion of steel, corrosion and current transfers in differential aeration cells, the effects of anodic/cathodic area ratio on corrosion rate, the effectiveness of cathodic protection systems in differential aeration cells, the determination of the average cathodic protection current density required to protect a structure affected by differential aeration, the effect of insulation on pipe line currents, variations of measured resistance with pipe diameter, current density and conductivity, the selection of suitable sacrificial anodes, and the general effectiveness of various corrosion inhibiting processes, additives, coatings and apparatus.

What is claimed is:

1. A method for determining the effect of a change in condition on the corrosion rate produced by a corrosive environment comprising maintaining a first confined zone of a corrosive environment, maintaining a second confined zone of a corrosive environment in electrolytic communication with said first zone, disposing a corrodible element in each of said zones, said elements being electrically connected for the flow of current therebetween, measuring the individual rates of corrosion of each of said corrodible elements, changing a condition influencing the corrosive character of one of said zones, and again measuring the individual rates of corrosion of each of said corrodible elements.

2. A method according to claim 1 including the step of measuring the current flow between said elements.

3. A method according to claim 2 including the step of breaking the electrical connection between said elements after the occurrence of corrosions of said elements and measuring the individual rates of corrosion of each of said corrodible elements while said electrical connection is broken.

4. A method according to claim 2 in which the condition changed is the pH of one of said zones.

5. A method in accordance with claim 2 in which the condition changed is the degree of agitation in one of said zones.

6. A method in accordance with claim 2 in which the condition changed is the temperature in one of said zones.

7. A method in accordance with claim 2 in which the condition changed is the dissolved solids concentration in one of said zones.

8. A method in accordance with claim 2 in which the condition changed is the oxygen concentration in one of said zones.

9. A method in accordance with claim 2 in which the condition changed is the surface area of one of said elements.

10. A corrosion-measuring apparatus comprising a vessel adapted to contain a corrosive environment, means within said vessel to divide same into two zones in electrolytic communication with one another, at least one corrosion-test probe disposed in each of said zones, each said probe comprising a pair of corrodible elements joined together at one end at a common juncture, one of said elements being coated to protect same from said corrosive environment, an electrical lead connected to said common juncture, and electrical leads connected to the other ends of each element, resistance-change corrosion-measuring means connected to said test probes, the elements of both probes being fabricated of the same metal, current-measuring means connected between said test probes to determine the current flow between the exposed elements thereof and means to vary a condition influencing the rate of corrosion in each of said zones.

11. A corrosion-measuring apparatus comprising a vessel adapted to contain a corrosive environment, means within said vessel to divide same into two zones in electrolytic communication with one another, a plurality of corrosion-test probes in one of said zones, a corrosion-test probe in the other zone, each said probe comprising a pair of corrodible elements joined together at one end at a common juncture, one of said elements being coated to protect same from said corrosive environment, an electrical lead connected to said common juncture, and electrical leads connected to the other ends of each element, resistance-change corrosion-measuring means connected to each of said corrosion-test probes, the elements of said probes being fabricated of the same metal, means to vary a condition influencing the rate of corrosion in each zone so that one zone becomes cathodic with respect to the other, and means to measure current flow connected between the corrosion-test probe in said other zone and said plurality of corrosion-test probes.

12. The apparatus in accordance with claim 11 in which said means to divide said vessel into two zones is a semi-permeable membrane.

13. The apparatus in accordance with claim 11 in which said means to measure said corrosion rates is a resistance-change bridge circuit.

14. The apparatus in accordance with claim 11 in which said means to change a condition in said zones is a bubble-pump connected to each of said zones.

15. The apparatus in accordance with claim 11 in which said means to measure current flow includes a zero-resistance ammeter.

(References on following page)

References Cited in the file of this patent

UNITED STATES PATENTS

| | | |
|---|---|---|
| 2,396,934 | Wallace | Mar. 19, 1946 |
| 2,851,570 | Schaschl | Sept. 8, 1958 |
| 2,857,320 | Hughes | Oct. 21, 1958 |

OTHER REFERENCES

Evans: "Metallic Corrosion Passivity and Protection," 1948, page 547.

Schaschl et al.: "Corrosion," vol. 13, April 1957, pages 35–43.